United States Patent Office 3,355,412
Patented Nov. 28, 1967

3,355,412
RESINOUS COMPOSITIONS
Donald P. Hart, North Olmsted, Ohio, and Joseph E. Plasynski, New Kensington, Pa., assignors to Pittsburgh Plate Glass Company, Pittsburgh, Pa., a corporation of Pennsylvania
No Drawing. Filed Aug. 16, 1965, Ser. No. 480,092
8 Claims. (Cl. 260—31.2)

This application is a continuation-in-part of application Ser. No. 176,094, filed Feb. 27, 1962, now abandoned, which is in turn a continuation-in-part of application Ser. No. 82,160, filed Jan. 12, 1961, now abandoned.

This invention relates to a pressure-sensitive adhesive composition which particularly finds utility with non-fibrous backings. Particularly, the invention relates to a pressure-sensitive adhesive composition comprising (1) a solution polymerized interpolymer comprising from 40 percent to about 85 percent of at least one compound having the formula:

I 

wherein R is an alkyl radical having at least 4 carbon atoms, and from about 60 percent to about 15 percent of a compound having the formula:

II 

wherein $R_1$ is an alkyl radical having from 1 to 5 carbon atoms, and (2) a solvent containing at least a major proportion of a compound selected from the group consisting of esters of organic acids, aliphatic hydrocarbons, cycloaliphatic hydrocarbons, ketones, alcohols, and mixtures thereof, said polymer having a viscosity of at least 3000 centipoises as a 50 percent solution in isopropyl acetate and a standard Williams plasticity number between about 1.4 and about 3.5.

Pressure-sensitive adhesives, which are normally used in the form of adhesive tapes or veneers and wall-papers, have attained considerable industrial importance; production of these materials is continuing to increase as new uses are being found.

Their function is to provide instantaneous adhesion when applied under light pressure, and most applications further require that they can be cleanly removed from the surface to which they have been applied by a light pull. They are characterized by having a built-in capacity to secure this instantaneous adhesion to a surface without activation, such as treatment with solvents or heat, and also by having sufficient internal strength so that the adhesive material will not rupture before the bond between the adhesive material and the surface ruptures. The capacity to obtain instantaneous adhesion is usually expressed as the amount of "tack" or "tackiness."

Ordinarily it is desirable to obtain as much tack as possible without losing a significant amount of internal strength (cohesion). One very simple test which may be used to evaluate materials which are to be used as a pressure-sensitive adhesive, comprises coating a backing with the material and folding the adhesive surface against itself until there is a bond obtained between the two surfaces of adhesive material. The two surfaces are then pulled apart.

The adhesive is then observed for the degree of "leg," that is, the distance the adhesive material extends from the backing before the two surfaces part. If the "leg" is too great, the adhesive lacks sufficient internal strength. Extreme "leg" is manifested by the formation of "spider web-like" fibers bridging the two surfaces. If, however, the surfaces pull apart with no more force than was needed to bring the two surfaces together, there is insufficient "tack" or adhesiveness.

The adhesive coating which is applied to the backing material should have in addition to permanent tack and adhesiveness, internal strength (cohesiveness), resilience, cushioning power, and usefulness over a wide range of temperatures. In order to obtain all of these qualities, it has been necessary to make these pressure-sensitive adhesives from several components and additives since no single compound or known composition was found to have all of the qualities which are necessary for a material to function as a pressure-sensitive adhesive. Polyisobutylene and the polyvinyl ethers have been used extensively as pressure-sensitive adhesives, but it has been found necessary in most instances to incorporate certain additives to impart tack, adhesion and wetting power to these materials; mixtures of more than one molecular weight polymer have been used.

A wide variety of backing materials are used for these tapes and the intended application usually determines which type of backing is selected. For example, 80 x 80 cotton cloth is frequently selected for surgical tapes; vinyl film, acetate, rayon and fiber glass cloths are often used in the electrical industry; silk is used in the photographic industry; cellophane and cellulose acetate films are generally used in transparent tapes; paper which has been impregnated with rubber, protein or resins is used in masking tapes; and vinyl films, particularly vinyl chloride films, are used for making veneers or other decorative coverings. Metal foils have also been used with pressure-sensitive tapes and have shown considerable promise in this application.

In many instances, the backing material has to be precoated on one side with a material called a "primer" or "subbing coat," to increase its affinity for the pressure-sensitive adhesive, and the pressure-sensitive adhesive is applied over this precoat. This method was applied in particular to the non-fibrous backings, such as regenerated cellulose, cellulose acetate, rubber hydrochloride, polyvinyl chloride, or poly(vinyl ester) films, wherein the smoothness of the uncoated surface made adhesion of the adhesive mass to the uncoated surface difficult. In other words, the primer or subbing coat acted as an adhesive to bond the pressure-sensitive adhesive to the backing material.

Much work has been done to try to find a single polymer which has all of the aforementioned properties necessary for a material to function as a pressure-sensitive adhesive; but none has been entirely successful. Resinous compositions having nothing more than certain plasticizers added thereto have been made which have good adhesion to certain backings, but migration of these plasticizers into the backings, especially the non-fibrous backings, has seriously restricted their use. Exudation of the plasticizer to the surface of the adhesive is also a serious problem.

It has been found that plasticized polyvinyl acetate may be used on non-fibrous backings without the need for a primer or subbing coat, but it lacks permanent tack, resilience and cushioning power to be considered as a pressure-sensitive adhesive. The chlorinated biphenyl resins serve as exceptionally good plasticizers for the polyvinyl acetate, but they show a marked tendency to migrate into the non-fibrous backings, or exude to the surface on aging for a few days.

Efforts have been made to copolymerize certain plasticizing monomers with vinyl acetate to form a polymer having an internally built-in plasticizer. It was found that the low molecular weight copolymers of vinyl acetate with these plasticizing monomers lack sufficient internal strength (cohesiveness) to be used as a pressure-sensitive adhesive, since adhesive would be left upon any substrate to which it had been applied. This problem was to a certain extent overcome through emulsion polymerization, whereby extremely high molecular weights are obtained. But, however, the water of the emulsion makes for an unduly long flashing period for application onto the adhesive backings, and therefore does not readily lend itself to commercial methods. Another disadvantage in preparing the adhesives in an emulsion medium lies in the fact that a surface-active agent and a protective colloid must be employed to form the emulsion, and these agents cannot be removed, practically speaking, and therefore make the adhesive much more sensitive to water; whereas, the compositions of the instant invention are extremely water resistant.

It has now been discovered that high molecular weight vinyl acetate copolymers can be utilized in the form of solutions rather than in emulsions if they are made so that they fall within the above-mentioned viscosity range. If the viscosity of the copolymer is below about 3000 centipoises as a 50 percent isopropyl acetate solution, the adhesive forces exceed the cohesive forces and the said copolymer is therefore unacceptable.

The resinous polymeric materials of the instant invention are characterized by a solution polymerized interpolymer such as described above and having a viscosity of at least about 3000 centiposes as a 50 percent solution in isopropyl acetate. Because of the great diversity in polymerization rates, the compound represented by Formula I must be added at a controlled rate to the compound represented by Formula II, or both of the reactive monomers must be added at a controlled rate to the reaction medium. One convenient method of preparation of the polymeric compositions of the instant invention is to heat, while agitating, the compound represented by Formula II and add incrementally a solution containing a compound represented by Formula I with a solvent and a particular catalyst. In addition to controlling the amounts of the reactive monomers in the reaction medium, it is also important to maintain control over the solvent to monomer ratio; for example, the polymerization is ordinarily conducted in a reaction mixture containing less than about 50 percent solvent. The solvents should not be of a nature which would result in excessive chain transfer.

It is an important aspect of the present invention that the resinous compositions have a standard Williams plasticity of at least about 1.4. Copolymers prepared in accordance with the instant invention having the lower acceptable viscosities (3000 to 4000 centipoises) as a 50 percent solution in isopropyl acetate, require larger amounts of the vinyl ester component in order to acquire the required Williams plasticity. As the viscosity of the copolymers is increased the maximum amounts of the vinyl ester becomes excessive and the vinyl ester component must be decreased. In order to control the maximum and minimum amounts of the monomer components of polymers having viscosities on the upper and lower ends of the acceptable range, the proportions should be adjusted to keep their Williams plasticity within the range of from about 1.4 to about 3.5, and preferably between about 1.4 and about 3.

The standard Williams plasticity number is defined as the resulting height in millimeters of a 2-gram sample of the solid polymer in a form approximating a sphere after a 5000 gram flat weight has been applied for 14 minutes to the sample held at 100° F.

While the compounds represented by Formula I include all of the acrylates from butyl up to octadecyl and even higher, it is preferred that the acrylates which have been formed from alcohols having from 8 to 14 carbon atoms be used; examples of these acrylates include 2-ethylhexyl acrylate, octyl acrylate, nonyl acrylate, decyl acrylate, undecyl acrylate, dodecyl acrylate, tridecyl acrylate and tetradecl acrylate. Compounds represented by Formula II include the vinyl esters of acetic acid, propionic acid, butanoic acid, pentanoic acid, the vinyl ester of acetic acid, however, being the preferred monomer. The acrylates must be present in an amount between about 40 percent and 85 percent by weight of the total polymer, and it is preferred that they be present in amounts ranging from 50 to 65 percent. Accordingly, the vinyl ester should be present in an amount between about 60 percent and 15 percent by weight of the total polymer and preferably between 50 percent and 35 percent.

The rate at which the acrylate may be added to the vinyl ester is contingent upon the weight proportions of the individual monomers, that is, the acrylate to the vinyl ester, and also to a great extent, the variation of reaction rates among the various acrylates and among the various esters.

The temperature of reaction is governed by the solvent which is to be employed in the reaction. It is preferable that the solvent or solvent mixture be one that forms a medium with reactive monomers which refluxes below 120° C. but above 65° C. The reaction temperature governs the choice of catalyst which may be used for the reactions of the polymers of the instant invention. While benzoyl peroxide is the preferred catalyst for carrying out said reaction, any one of the variety of free radical catalysts which operate within the temperature range of about 65° C. to about 120° C. may be employed. Examples of such catalysts include tertiary butyl hydroperoxide, alpha, alpha-azo-bis isobutyronitrile, cumene hydroperoxide, ditertiary butyl peroxide, and dicumyl peroxide.

The nature of the solvent system in which the resinous polymers of the instant invention are dissolved may be varied to some extent in accordance with the objective which is to be accomplished. While isopropyl acetate and other esters of organic acids have the desirable quality of "biting" into many of the non-fibrous backing films, in order that the adhesive will adhere strongly to the backing, it is also advantageous at times to use aliphatic hydrocarbons (which have no appreciable effect upon non-fibrous backings), including straight chain aliphatic hydrocarbons, such as pentane, hexane, heptane, etc., and cycloaliphatic hydrocarbons, such as cyclohexane and the like. Other esters that could be used include ethyl acetate, isobutyl acetate, ethyl propionate, and others. It is, of course, necessary that the solvents be liquids of reasonable volatility to permit their evaporation without excessive heating during drying of the adhesive film, but at the same time they should not be so volatile as to evaporate prematurely.

In addition to the use of esters and aliphatic hydrocarbons, it is desirable to add a certain amount of a high vapor pressure solvent, preferably one of the lower alkyl alcohols, such as methanol through propanol, or ketones such as acetone, methyl ethyl ketone, and the like. These high vapor pressure solvents are usually added after the polymerization is complete and are used to adjust the final solids content to a value between 20 and 50 percent of the total weight of the adhesive composition. The foregoing solvents should comprise the major proportion of the solvent system, and desirably form at least about 90 percent by weight of the solvent. It has been found that certain amounts (up to 10 percent by weight of the solvent) of a chain transfer agent, such as a lower alcohol or an aromatic compound, may be used with the solvent system during the polymerization to keep the molecular weight low enough so that polymer stays in solution. Viscosities above 110,000 centipoises as a 50 percent solution in isopropyl acetate are beyond the upper limit; higher molecular weights tend to form gels.

It should be noted that the resinous compositions of the instant invention are provided in a much higher solids content than many of the previously prepared pressure-sensitive adhesive compositions, particularly the polyvinyl ether adhesives which can be applied at the most 15 to 20 percent solids. It is easily seen that when the composition must be marketed at low solids content (the adhesives are used on the backing at 100 percent solids) that their expense is prohibitive and when combined with the fact that many of these pressure-sensitive adhesives must be compounded from many different materials, such as for instance, the polyvinyl ether adhesives, that the single component high solids content adhesives of the instant invention provide a step forward in the art.

As previously mentioned, it was thought that when interpolymers prepared from the components which are used to prepare the compositions of the instant invention, they had to be prepared using emulsion polymerization techniques in order to obtain a molecular weight high enough to provide cohesive strength greater than the adhesive strength of the adhesive composition itself. The interpolymers which are prepared using emulsion techniques for the polymerization usually result in products having excessively high molecular weights, which when precipitated and dried from the emulsion medium prove to be insoluble in solvents which are used as the polymerization medium of the instant invention. In addition to the fact that the aqueous medium of the emulsion composition provides an unduly slow flashing procedure, it is also a disadvantage of the emulsion system in that the emulsions tend to break down over prolonged periods and are also subject to coagulation from freezing temperatures and contamination; these two points significantly affect the marketability of the said adhesive compositions.

The resinous compositions of the instant invention are applied by roll coating, spraying, drawing, or doctor blade to almost any backing. Particularly useful are the nonfibrous backings, such as cellophane (regenerated cellulose), Mylar (terephthalic polyester), neoprene sheet (polychloroprene), and the various polyvinyl chloride materials such as for example, Lustran. The adhesive is applied sufficiently thick so that after flashing the dry adhesive film is from ½ to 2 mils thick. The films are usually flashed for 30 to 60 seconds at a temperature ranging from 250° F. to about 300° F.

The various products which may be prepared from the instant adhesives may be applied to hardboard, most kinds of plastics, metals, or almost any other surface which is not overly rough.

The resinous adhesive compositions of the instant invention are also particularly adaptable to be used on surgical tapes, etc., which may be applied without irritation to the skin. These compositions usually have a Williams plasticity number approaching 2, which is desirable for this application.

The said adhesive compositions also find utility as a "bottled adhesive" which may be used directly onto the surface of a large variety of materials, including paper and other various fibrous backings.

The preparation and use of several preferred embodiments of the invention are set forth in the following examples. All parts and percentages in the examples, as throughout this specification, are by weight unless otherwise specified.

*Example I*

This example relates to the preparation of a 60-40 ethyl hexyl acrylate-vinyl acetate copolymer.

A solution consisting of 600 parts ethyl hexyl acrylate, 566 parts isopropyl acetate and 5 parts of benzoyl peroxide was added dropwise over a period of 3 hours and 20 minutes to a refluxing solution consisting of 400 parts vinyl acetate and 300 parts isopropyl acetate. The refluxing was continued for 4½ hours more with agitation. After one additional hour of reflux, a solution consisting of 3.8 parts benzoyl peroxide and 46 parts isopropyl acetate was added over the first half hour of each successive hour and a half interval. After completion of the reaction, 500 parts isopropyl alcohol were added to the reaction mass. The final product had the following properties:

Total solids (percent) _____ 39.6
Viscosity (Gardner-Holdt) _____ W-X

The sample was cut to 30 percent solids with isopropyl alcohol and flashed on polyvinyl chloride film for 1 minute at 265° F.

The initial tack and leg were excellent. The adhesive maintained this tack and leg over the temperature range of from 30° F. to 175° F.

*Example II*

This example relates to the preparation of a copolymer of 60 percent ethyl hexyl acrylate and 40 percent vinyl acetate.

In a suitable vessel, 400 parts vinyl acetate were heated with agitation to 70° C. In a solution consisting of 600 parts ethyl hexyl acrylate, 400 parts aliphatic hydrocarbon (Gulf's VM and P) and 5 parts benzoyl peroxide were added dropwise thereto over a period of 4 hours and 15 minutes. After another half hour, 150 parts more of aliphatic hydrocarbon (Gulf's VM and P) were added to the reaction mass. After another half hour, 2 parts benzoyl peroxide in 14 parts acetone and 186 parts aliphatic hydrocarbon (Gulf's VM and P) were added dropwise to the reaction mass over a ½ hour period. The reaction was continued for three more one-hour intervals; after the first two intervals, 2 parts benzoyl peroxide in 14 parts acetone and 78 parts aliphatic hydrocarbon (Gulf's VM and P) were added dropwise over a period of 15 minutes. After completion of the reaction, 200 parts of isopropyl alcohol and 224 parts of ethyl alcohol were added to the reaction mass. The resultant product had the following properties:

Total solids (percent) _____ 41.1
Viscosity (Gardner-Holdt) _____ U+

*Example III*

This example relates to the preparation of a 50-50 copolymer of n-octyl acrylate and vinyl acetate.

A solution comprising 250 parts n-octyl acrylate, 250 parts ethyl acetate and 5 parts benzoyl peroxide was added dropwise to a flask containing 250 parts vinyl acetate and 250 parts ethyl acetate. During the addition, the reaction mixture was kept at a temperature between 72° C. and 74° C. with continuous agitation. After 1 hour, 2.5 parts benzoyl peroxide were added to the reaction mixture. The reaction was then refluxed for 2 more hours, after which 2.5 parts more benzoyl peroxide were added and the mixture was refluxed for another 2 hour interval. The resultant product had the following properties:

Total solids (percent) _____ 49
Viscosity (Gardner-Holdt) _____ $Z_5$

Six (6) parts of isopropyl alcohol were added to 30 parts of the above resinous solution and applied to an unprimed polyvinyl chloride sheet. After flashing for 60 seconds at 265° F., the sheet containing the adhesive had excellent tack.

*Example IV*

This example relates to the preparation of a 50-50 copolymer of ethyl hexyl acrylate and vinyl propionate.

A solution consisting of 200 parts isopropyl acetate, 250 parts ethyl hexyl acrylate and 5 parts benzoyl peroxide was added dropwise over a 3-hour period to a flask containing 250 parts vinyl propionate and 250 parts isopropyl acetate. The reaction mixture was maintained at a temperature between 80° C. and 89.1° C. with continuous agitation. After 1 hour reflux, 1.25 parts benzoyl peroxide and 50 parts isopropyl acetate were added to the reaction mixture. After refluxing another hour, the reaction mixture was then cooled to room temperature. The final product had the following properties:

| | |
|---|---|
| Total solids (percent) | 51.5 |
| Viscosity (Gardner-Holdt) | Z |

The product was applied to unprimed vinyl sheet and flashed for 60 seconds at 265° F. to 267° F. Initial tack was good.

*Example V*

This example relates to the preparation of a 60-40 copolymer of ethyl hexyl acrylate and vinyl acetate. The following solutions were made up:

| Solution A: | Parts |
|---|---|
| Ethyl hexyl acrylate | 90 |
| Vinyl acetate | 60 |
| Isopropyl acetate | 55 |
| Solution B: | |
| Isopropyl acetate | 25 |
| Benzoyl peroxide | 1.5 |

Solution A (75 parts) was added to a suitable vessel and purged with nitrogen. Solution B (5 parts) was added thereto and heated to reflux at 90° C. The remainder of solution A was added dropwise over a 1-hour period and during the same 1-hour period, increments of solution B (5 parts) were added every 15 minutes. After the said 1-hour period, the remainder of solution B was added to the reaction medium. Isopropyl acetate (75 parts) was then added and the reaction mass was refluxed for 2 hours, after which more isopropyl acetate (50 parts) was added. The final product, which was slightly hazy, had the following properties:

| | |
|---|---|
| Total solids (percent) | 41.9 |
| Viscosity (Gardner-Holdt) | $Z_4$ |
| Standard Williams plasticity number | 2.8-3 |

The product was cut to 30 percent solids with isopropyl alcohol, which then had a viscosity (Gardner-Holdt) of V. This product, which is clear, was applied to a polyvinyl chloride backing and flashed at 265° F. for one minute. The flashed film, which was 0.2 mil thick, had good tack and no leg, and had excellent adhesion to the backing.

As indicated above, it is essential that the interpolymer be produced in solution, rather than by emulsion polymerization. Tests have shown that inferior adhesive properties are attained from dried films of corresponding emulsion polymerized interpolymers of the same composition and plasticity as the solution polymerized interpolymers described herein. For instance, the tack of an interpolymer made as in Example I above, having a Williams plasticity of 1.5, was compared with the tack of a corresponding emulsion polymerized polymer with a plasticity of 1.4 (tack is an essential property of a pressure sensitve adhesive). The emulsion polymer was prepared using conventional techniques, as follows:

A solution of the following was made:

| | Parts by weight |
|---|---|
| Deionized water | 1500 |
| Polyvinyl alcohol (Elvanol 50-42) | 15.8 |
| Dioctyl ester of sodium sulfosuccinic acid (Aerosol OT) | 15.8 |
| Sodium sulfate derivative of undecanol (Tergitol 4) | 98 |
| Anionic ester of phosphoric acid (QS-44) | 19.8 |
| Aqueous 5 percent sodium bicarbonate solution | 205 |
| Potassium persulfate | 10 |

The above solution was heated to 73° C.; while vigorously agitating the hot solution a mixture of 600 parts of 2-ethylhexyl acrylate and 400 parts of vinyl acetate was added over a 3 hour period. After the addition was complete, reaction conditions were maintained for 30 minutes and the mixture was cooled. The emulsion obtained had a solids content of 39.7 percent and the interpolymer therein had a Williams plasticity of 1.4.

The above polymers were each coated on glass plates and dried to give a 1 mil thick dry film. The tack of the films was tested using a Rolling Ball Tack Test (promulgated by the Pressure Sensitive Tape Council). In this test, a 5.5 gram stainless steel ball is rolled onto the adhesive film from a 5-inch long, V-shaped channel inclined at a 20° angle and brought to the horizontal through a 1 inch section. The distance the ball travels over the film before stopping is a measure of the tack, the shorter the distance the greater the tack. The results were as follows:

| Adhesive: | Distance, inches |
|---|---|
| Interpolymer of Example 1 | 2.5 |
| Emulsion-polymerized polymer | 5.5 |

Thus, the tack of the emulsion polymer was substantially less, and this despite its slightly lower plasticity (which favors increased tack) and the use of low plasticity materials which in the case of the higher molecular weight emulsion polymer also favors tackiness in the film. The inferior results are attributed to the basic nature of emulsion polymerized products, which by necessity include emulsifiers and the like.

An attempt was also made to make a solution of the above emulsion polymer. The interpolymer was precipitated with acidified (HCl) 1 percent aluminum sulfate solution, washed with water and dried, but the polymer could not be dissolved in even a large excess of either the solvent system of the solution polymer of Example 1 (isopropyl alcohol/isopropyl acetate in a $57/_{43}$ ratio), nor in acetone. The polymer swelled but did not dissolve. Thus, one could not achieve the products of the present invention in this manner.

Although specific examples of the invention have been set forth hereinabove, it is not intended that the invention be limited solely thereto, but to include all of the variations and modifications falling within the scope of the appended claims.

We claim:

1. An adhesive composition which when dried forms a tacky, pressure-sensitive film, said composition consisting essentially of organic solvent and dissolved therein a solution polymerized interploymer of monomers consisting essentially of:
   (1) from about 40 percent to about 85 percent by weight of at least one compound of the formula:

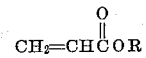

where R is an alkyl radical having from about 4 to about 18 carbon atoms, and
   (2) from about 60 percent to about 15 percent by weight of at least one compound of the formula:

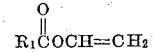

where $R_1$ is an alkyl radical having from 1 to about 5 carbon atoms;

said interpolymer having a viscosity of from about 3000 centipoises to about 110,000 centipoises as a 50 percent solution in isopropyl acetate and having a Williams plasticity between about 1.4 and about 3.5; said organic solvent containing a major proportion of a member of the group consisting of esters of organic acids, aliphatic hydrocarbons, cycloaliphatic hydrocarbons, ketones, alcohols, and mixtures thereof.

2. The composition of claim 1 in which R is an alkyl radical having from 8 to 14 carbon atoms.

3. The composition of claim 1 in which R is an alkyl radical having 8 carbon atoms.

4. The composition of claim 1 in which R is an alkyl radical having from 8 to 14 carbon atoms and $R_1$ is methyl.

5. The composition of claim 1 in which R is an alkyl radical having 8 carbon atoms and $R_1$ is methyl.

6. An adhesive composition which when dried forms a tacky, pressure-sensitive film, said composition consisting essentially of organic solvent and dissolved therein a solution polymerized interpolymer of monomers consisting essentially of from about 50 percent to about 65 percent by weight of 2-ethylhexyl acrylate and from about 50 percent to about 35 percent by weight of vinyl acetate;
said interpolymer having a viscosity of from about 3000 centipoises to about 110,000 centipoises as a 50 percent solution in isopropyl acetate and having a Williams plasticity between about 1.4 and about 3;
said organic solvent containing at least about 90 percent by weight of a member of the group consisting of esters of organic acids, aliphatic hydrocarbons, cycloaliphatic hydrocarbons, ketones, alcohols, and mixtures thereof.

7. An adhesive composition which when dried forms a tacky, pressure-sensitive film, said composition consisting essentially of organic solvent and dissolved therein a solution polymerized interpolymer of:
(1) from about 40 percent to about 85 percent by weight of at least one compound of the formula:

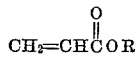

where R is an alkyl radical having from about 4 to about 18 carbon atoms, and
(2) from about 60 percent to about 15 percent by weight of at least one compound of the formula:

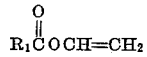

where $R_1$ is an alkyl radical having from 1 to about 5 carbon atoms;
said interpolymer having a viscosity of from about 3000 centipoises to about 110,000 centipoises as a 50 percent solution in isopropyl acetate and having a Williams plasticity between about 1.4 and about 3.5.

8. A method of producing an interpolymer which when dried forms a tacky, pressure-sensitive film, which comprises heating an organic solvent solution containing a free-radical catalyst, said solution consisting essentially of:
(a) less than 50 percent, based on the total weight of said solution, of organic solvent at least about 90 percent of which is selected from the group consisting of esters of organic acids, aliphatic hydrocarbons, cycloaliphatic hydrocarbons, ketones, alcohols, and mixtures thereof, and
(b) a mixture of monomers consisting essentially of:
(1) from about 40 percent to about 85 percent by weight, based on the total monomers, of at least one alkyl acrylate of the formula:

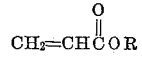

where R is an alkyl radical having from about 4 to about 18 carbon atoms, and
(2) from about 60 percent to about 15 percent by weight, based on the total monomers, of at least one vinyl ester of the formula:

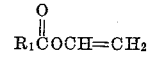

where $R_1$ is an alkyl radical having from 1 to about 5 carbon atoms;
said method comprising the addition of said alkyl acrylate to said vinyl ester at a controlled rate so as to provide an interpolymer having a viscosity of from about 3000 centipoises to about 110,000 centipoises as a 50 percent solution in isopropyl acetate and having a Williams plasticity between about 1.4 and about 3.5.

References Cited

UNITED STATES PATENTS

| | | | |
|---|---|---|---|
| 2,412,475 | 12/1946 | Semegen | 260—86.1 |
| 3,063,844 | 11/1962 | Meguro et al. | 260—86.1 |
| 3,189,581 | 6/1965 | Hart et al. | 260—31.2 |

FOREIGN PATENTS

| | | |
|---|---|---|
| 208,845 | 6/1957 | Australia. |

OTHER REFERENCES

Horn: "Acrylic Resin," Reinhold Publishing Corporation, New York, 1960, pages 27, 116, and 148.

MORRIS LIEBMAN, *Primary Examiner.*

B. A. AMERNICK, *Assistant Examiner.*